United States Patent [19]
Whitman

[11] Patent Number: 5,398,713
[45] Date of Patent: Mar. 21, 1995

[54] CENTRIFUGAL VALVE

[76] Inventor: Leslie D. Whitman, Box 413 - Elkton Rd., Greenville, Ky. 42345

[21] Appl. No.: 170,818

[22] Filed: Dec. 21, 1993

[51] Int. Cl.⁶ ............................................. G05D 13/36
[52] U.S. Cl. .......................................... 137/54; 137/56
[58] Field of Search ...................................... 137/54, 56

[56] References Cited
U.S. PATENT DOCUMENTS

| 2,938,502 | 5/1960 | Neal | 137/56 X |
| 3,090,596 | 5/1963 | Gifford | 251/357 X |
| 4,424,826 | 1/1984 | Kuusik | 137/54 |

Primary Examiner—Robert G. Nilson

[57] ABSTRACT

A valve which controls the movement of pressurized fluid through a passage, the regulation of which is determined by the application of a centrifugal force generated by the rotation of the valve about a fixed axis 3 Claims, 2 Drawing Sheets

CENTRIFUGAL VALVE

BRIEF SUMMARY OF THE INVENTION

The Centrifugal Valve was developed primarily for use in the mining industry. It is the central component of a Centrifugal Valve system designed to control dust and other airborne particles produced in the movement of coal, ore or other material along a continuous conveyor belt 21. Dust is a major health and environmental hazard in mining and other industries. The most elemental method of control is to apply a mist of water to moisten the airborne particles. However, in doing so, care must be taken to control the excess use of water which is both costly and can shorten the life of the equipment being moistened. Therefore, it is preferable to apply the water mist only when product is moving along a continuous conveyor belt 21. The Centrifugal Valve system provides this control: The Centrifugal Valve opens as product moves along the continuous conveyor belt 21 and closes either when no product is present or when movement of the continuous conveyor belt 21 ceases.

A number of dust control systems have been developed and are in use in industry. Some of these are electric or electronic systems designed to apply a water mist when the continuous conveyor belt 21 is moving or when the humidity level drops below a predetermined level. However, unlike these systems, the Centrifugal Valve system is attached to and is powered by the movement of the continuous conveyor belt 21 over which the product passes; that is, the regulation of the system does not require an independent power source; the valve is opened or closed solely by its rotation or non-rotation which is powered by and dependent upon the movement of product along a continuous conveyor belt 21.

In practice a continuous conveyor belt 21 consists of a series of self-contained units in which a continuous conveyor belt 21 moves upon and is supported by a series of rollers 22 placed at regular intervals. When product is loaded onto the continuous conveyor belt 21, the continuous conveyor belt 21 sags and rolls upon the support rollers 22. In the Centrifugal Valve System, the Centrifugal Valve is contained within a rotatable drum housing 1 which is installed in such proximity to a continuous conveyor belt 21 that the loaded continuous conveyor belt 21 sags down and comes in contact with the mounted drum housing 1. As the loaded continuous conveyor belt 21 moves in contact with the drum housing 1, it propels the rotation of the drum housing; this rotation generates a centrifugal force within the drum housing 1. This centrifugal force causes the sequential outward movement of the pistons, which in the stationary position block movement through the Centrifugal Valve exhaust jets 13a, 13b. When the pistons 3 are dislodged from their stationary position by the centrifugal force, the exhaust jets 13a, 13b are opened and water flows through the valve to the output side 9 where it is directed to cause a spray over the product moving along the continuous conveyor belt 21.

Although developed primarily for use in the mining industry as a component of the Centrifugal Valve system, the Centrifugal Valve has application in any setting in which the following requirements are present:

(i) regulation of the flow of a pressurized fluid (i.e., turn on or off) is required; and (ii) regulation of the such flow is directly (or inversely) related to the movement or rotation of some adjacent system.

DETAILED DESCRIPTION

Figure 1:
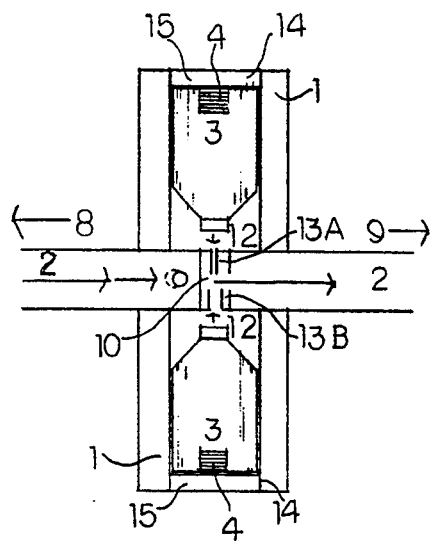
FIG. 1: Vertical section through of Centrifugal Valve with pistons in open position
Figure 2:
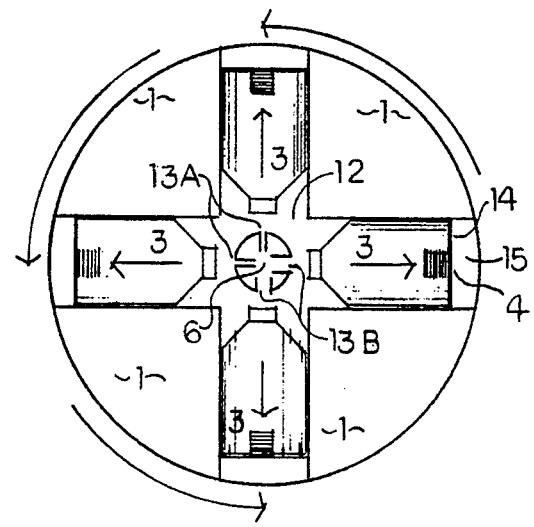
FIG. 2: Horizontal section through of Centrifugal Valve with pistons in open position
Figure 3:
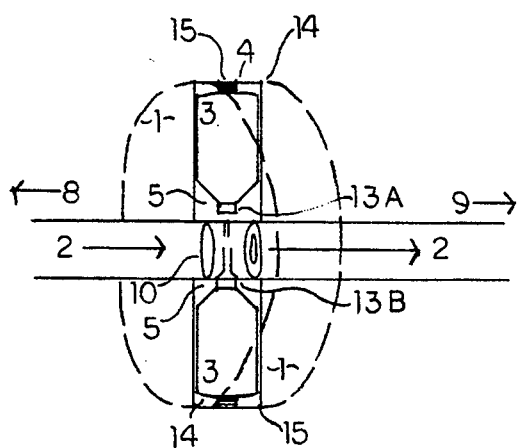
FIG. 3: Perspective section through of Centrifugal Valve with pistons in open position
Figure 5:
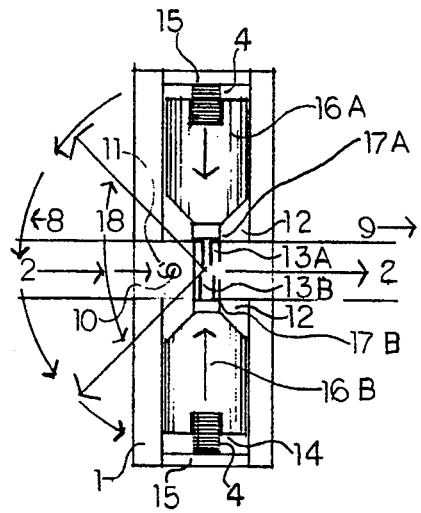
FIG. 5: Vertical section through of Centrifugal Valve with pistons in closed position detailing forces working upon the Centrifugal Valve
Figure 4:
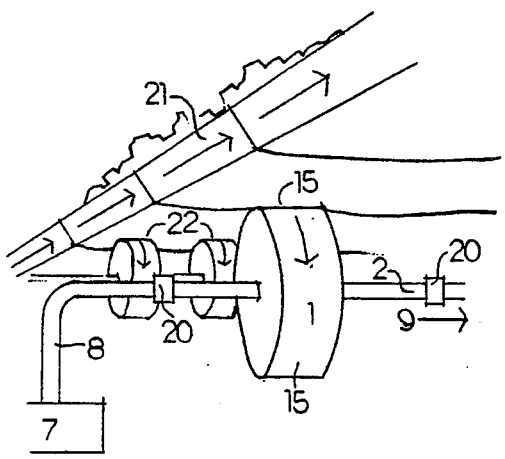
FIG. 4: Perspective of continuous conveyor belt, rollers and Centrifugal Valve drum housing
Figure 6:
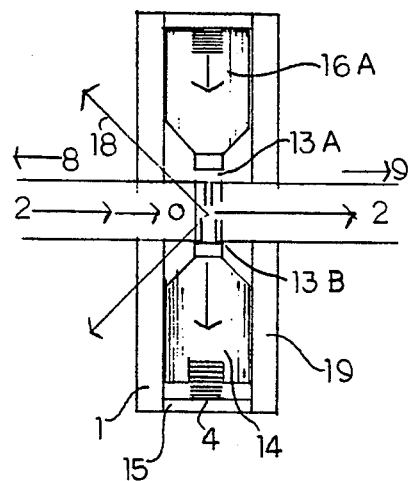
FIG. 6: Vertical section through of Centrifugal Valve with "leader jet" piston in open position and "supply jet" piston in closed position.

The components of the Centrifugal Valve include the drum housing 1 and supply shaft 2 which supply shaft 2 passes through the center point 6 of the drum housing 1. In addition to being the axis with which the drum housing 1 rotates, the supply shaft 2 serves as the conduit through which pressurized fluid passes from the stationary supply source 7; the supply shaft 2 runs from the intake side 8 through the center point 6 of the drum housing 1 to the output side 9. The supply shaft 2 being connected on each the intake side 8 and the output side 9 by means of rotating joints 20; these rotating joints 20 permit the supply shaft 2 to which the drum housing 1 is attached to rotate while allowing the passage of pressurized fluid from the stationary supply source 7 through the device to the stationary output side 9. The pistons 3 are positioned within cylindrical borings that transect the diameter of the drum housing 1; the area within such borings located at the interior side (i.e., the end pointed toward the center of the drum housing 1) of the pistons 3 not within the supply shaft 2 and not displaced by such pistons 3 being referred to as the piston chamber 12. The interior side of each piston being equipped with a sealing tip 5.

As pressurized fluid moves from the stationary supply source 7 through the supply shaft 2 toward the piston chamber 12, passage into the piston chamber 12 is blocked by a barrier plate 10. On the input side of the barrier plate 10 and adjacent to the piston chamber 12, two intake passages 11, located at an interval of 180 degrees, allow passage from the supply shaft 2 into the piston chamber 12. On the output side 9 of the barrier plate 10 and within the area of the supply shaft 2 that is adjacent to the piston chamber 12, exhaust jet passages 13a, 13b allow passage from the piston chamber 12 to the output side 9 of the supply shaft 2. However, in the stationary position, these exhaust jet passages 13a, 13b are sealed by pistons 3 as pressure is applied by the piston springs 4 located under the surface cap 15 of the drum housing 1. These exhaust jet passages 13a, 13b are of two different sizes, the smaller being the "leader jet" passage 13a, while the larger is the "supply jet" passage 13b.

When a pressurized fluid is applied to the system, two forces work to hold the pistons 3 in place: (i) the force 16a, 16b of the piston spring 4 (which is the same for both pistons); and (ii) either the force 17a exerted by the pressurized fluid upon a "leader jet" passage 13a, or the force 17b exerted by the pressurized fluid upon a "supply jet" passage 13b. Because the area of a "leader jet" passage 13a is smaller than that of a "supply jet" passage 13b, the force 17a exerted by the pressurized fluid upon a "leader jet" passage 13a is smaller than the force 17b exerted upon a "supply jet" passage 13b; therefore, the centrifugal force required to overcome the combined forces holding a piston 3 against a "leader jet" passage 13a (i.e., the force 16a exerted by the piston spring 4 and the force 17a exerted by the pressurized fluid present in the piston chamber) is less than the force required to overcome the forces (i.e., 16b, 17b) working on a "supply jet" passage 13b.

As the Centrifugal Valve drum housing 1 rotates with the supply shaft 2, a centrifugal (i.e., an outward) force 18 is generated. When this centrifugal force 18 overcomes the counteracting forces holding the piston 3 against a "leader jet" passage (i.e., the force 16a of the piston spring 4 and the force 17a of the pressurized fluid in the piston chamber), the piston 3 sealing a "leader jet" passage 13a will slide outward against the piston spring 4 opening the "leader jet" passage 13a. As the "leader jet" passage 13a opens, the escaping pressurized fluid strikes the piston 3 sealing the opposite "supply jet" passage 13b exerting force 19 for said piston 3 to move to compress its piston spring 4. Also, the opening of a "leader jet" passage 13a results in a decrease in force 17b being applied against a closed "supply jet" passage 13b, because a portion of the pressurized fluid exerting such force 17b escapes through the opened "leader jet" passage 13a to the output side 9 decreasing the force 17b exerted by the remaining pressurized fluid working upon the "supply jet" passage 13b. The combination of these two factors together with the centrifugal 18 force generated by the rotation causes the larger "supply jet" passage 13b to open permitting a free flow of pressurized fluid through the valve to the output side 9.

The Centrifugal Valve closes in the reverse order of its opening. As the rotation decreases, the centrifugal force 18 decreases, and when the centrifugal force 18 generated by the rotation is less than the opposing forces 16a, 16b of the piston springs 4, the forces 16a, 16b exerted by the springs 4 will cause the valve to close.

I claim:

1. An apparatus employed to control the flow of a pressurized fluid through a passageway, the operation of which is controlled by the application of a centrifugal force generated by the rotation of said apparatus, said apparatus including a discontinuous supply shaft comprised of (i) an input side, said input side spanning from a connection of said supply shaft with a source of said pressurized fluid to intake passages located anterior to a barrier plate, said barrier plate being located within said supply shaft and (ii) an output side, said output side spanning from exhaust jet passages, said exhaust jet passages being located within said supply shaft, to the point of expulsion of said pressurized fluid; a drum housing, comprised of cylindrical borings made through the diameter of said drum housing; said cylindrical borings being enclosed by surface caps where positioned within said enclosed cylindrical borings are pistons, each said piston resting against a piston spring located on the exterior end of each said piston between said piston and said surface cap, the area within said enclosed cylindrical borings located on the interior side of said pistons being without said supply shaft and not displaced by said pistons being a piston chamber; said drum housing is mounted upon and can rotate with said supply shaft which passes through the center point of said drum housing, said supply shaft being the passageway through which said pressurized fluid flows to the interior of said apparatus where further progression through said apparatus is blocked by said barrier plate which causes said pressurized fluid to proceed into said piston chamber through said intake passages where further progression out from said piston chamber is possible only through said exhaust jet passages being of two different sizes, a smaller leader jet passage and a larger supply jet passage; in the stationary position, said exhaust jet passages are sealed by said pistons where the forces working to hold each said piston in the closed position are (i) the force of said piston spring and (ii) the force exerted on said piston by said pressurized fluid within said piston chamber; in the state of rotation of said apparatus, the consequent centrifugal force acts to first move said pistons sealing said leader jet passages causing same to slide outward compressing said piston spring and opening said leader jet passages.

2. An apparatus described in claim 1 in which after said pistons sealing said leader jet passages open, the pressure exerted by said pressurized fluid on said supply jet passages decreases as said pressurized fluid escapes through said leader jet passages and strikes said pistons sealing said supply jet passages exerting force for said pistons to slide outward compressing said piston springs and opening said supply jet passages.

3. An apparatus described in claim 2 in which the openings of said leader jet passages and said supply jet passages allow passage of said pressurized fluid from said input side to said output side.

* * * * *